(12) United States Patent
Ljung et al.

(10) Patent No.: US 11,741,757 B2
(45) Date of Patent: Aug. 29, 2023

(54) ENTRANCE PERMIT CONTROL

(71) Applicant: Sony Network Communications Europe B.V., Hoofddorp (NL)

(72) Inventors: Rickard Ljung, Helsingborg (SE); Carl-Johan Weiderstrand, Lomma (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/081,850

(22) Filed: Oct. 27, 2020

(65) Prior Publication Data
US 2021/0233340 A1 Jul. 29, 2021

(30) Foreign Application Priority Data
Jan. 28, 2020 (SE) .................................. 2050082-3

(51) Int. Cl.
*E05C 17/56* (2006.01)
*G07C 9/00* (2020.01)
(Continued)

(52) U.S. Cl.
CPC .......... *G07B 15/02* (2013.01); *G06K 7/10861* (2013.01); *G06K 7/1447* (2013.01);
(Continued)

(58) Field of Classification Search
CPC ........ G07C 9/20; G07C 9/28; G06K 7/10861; G06K 7/1447; G06K 2007/10504;
(Continued)

(56) References Cited

U.S. PATENT DOCUMENTS 8,397,984 B1 3/2013 Bascombe
9,038,896 B2 5/2015 Williams et al.
(Continued)

FOREIGN PATENT DOCUMENTS

CN 102326187 A 1/2012
CN 104094081 A 10/2014
(Continued)

OTHER PUBLICATIONS

European Search Report from corresponding European Application No. 20203859.2, dated Mar. 31, 2021, 3 pages.
(Continued)

*Primary Examiner* — Tanmay K Shah
(74) *Attorney, Agent, or Firm* — Tucker Ellis LLP

(57) ABSTRACT

A system for entrance permit control is configured to monitor individuals in an entrance region that includes an entrance to a restricted area. The system performs a monitoring method to enable a seamless entrance experience for the individuals. The system receives a stream of digital images of the entrance region, and processes the received stream of digital images for detection of a machine-readable code, MRC, displayable on an entrance permit carried by an individual in the entrance region. The system further tracks, based on the received stream of digital images, a location of the MRC within the entrance region, initiates a validation of the MRC, and provides, in dependence of the validation and position data generated by the tracking, a visual indication of a result of the validation on at least one of the entrance permit and the individual.

19 Claims, 5 Drawing Sheets

(51) Int. Cl.

| | |
|---|---|
| *G07B 15/02* | (2011.01) |
| *G06T 7/70* | (2017.01) |
| *G07C 9/20* | (2020.01) |
| *G06K 7/10* | (2006.01) |
| *G06K 7/14* | (2006.01) |
| *G06Q 30/018* | (2023.01) |
| *G06Q 50/26* | (2012.01) |
| *G06T 7/20* | (2017.01) |
| *G06V 20/52* | (2022.01) |
| *G06V 40/10* | (2022.01) |
| *G06F 3/14* | (2006.01) |

(52) U.S. Cl.
CPC ....... *G06Q 30/0185* (2013.01); *G06Q 50/265* (2013.01); *G06T 7/20* (2013.01); *G06T 7/70* (2017.01); *G06V 20/53* (2022.01); *G06V 40/10* (2022.01); *G07C 9/20* (2020.01); *G06F 3/14* (2013.01); *G06K 2007/10504* (2013.01); *G06T 2207/10016* (2013.01); *G06T 2207/30196* (2013.01)

(58) Field of Classification Search
CPC ......... G06K 19/06112; G06Q 30/0185; G06Q 50/265; G06T 7/20; G06T 7/70; G06T 2207/10016; G06T 2207/30196; G06V 10/40; G06V 20/53; G06V 40/10; G06V 30/10; G06F 3/14; G08B 5/36; G07B 15/02
USPC .......................................................... 340/5.7
See application file for complete search history.

(56) References Cited

U.S. PATENT DOCUMENTS

| | | | |
|---|---|---|---|
| 10,108,909 B2 | 10/2018 | Sulavik et al. | |
| 10,109,125 B1 | 10/2018 | Gerace et al. | |
| 10,380,814 B1* | 8/2019 | Mathiesen | G07C 9/253 |
| 11,151,481 B1* | 10/2021 | Sun | G06V 40/161 |
| 11,515,481 B2* | 11/2022 | Kim | H01L 51/0085 |
| 2003/0128099 A1 | 7/2003 | Cockerham | |
| 2003/0169337 A1 | 9/2003 | Wilson et al. | |
| 2010/0033572 A1 | 2/2010 | Trela | |
| 2012/0022902 A1 | 1/2012 | Gressel et al. | |
| 2012/0091202 A1 | 4/2012 | Cohen et al. | |
| 2014/0039945 A1 | 2/2014 | Coady et al. | |
| 2015/0294515 A1 | 10/2015 | Bergdale et al. | |
| 2015/0317853 A1* | 11/2015 | Reymann | G07C 9/20 340/5.7 |
| 2016/0364590 A1 | 12/2016 | Wadley | |
| 2018/0053312 A1 | 2/2018 | Ross | |
| 2018/0268182 A1 | 9/2018 | Smith et al. | |
| 2019/0019361 A1 | 1/2019 | Kayhani et al. | |
| 2019/0043281 A1 | 2/2019 | Aman | |
| 2019/0360812 A1 | 11/2019 | Kayhani et al. | |

FOREIGN PATENT DOCUMENTS

| | | |
|---|---|---|
| CN | 104200552 A | 12/2014 |
| CN | 105389866 B | 10/2017 |
| CN | 107992779 A | 5/2018 |
| CN | 109979059 A | 7/2019 |
| KR | 20140124289 A | 10/2014 |
| KR | 102053945 B1 | 12/2019 |

OTHER PUBLICATIONS

Swedish Search Report for corresponding Swedish Application No. 2050082-3, dated Aug. 19, 2020, 3 pages.
Hensen, Daniel Kold et al., "Real-time Barcode Detection and Classification Using Deep Learning", Proceedings of the 9th International Joint Conference on Computational Intelligence, pp. 321-327, 2017.
Final Notice (Intent to Grant) for corresponding Swedish Application No. 2050082-3, dated Aug. 19, 2020, 3 pages.
Chinese Office Action dated Aug. 2, 2022 for Application Serial No. 202110033284 (12 pages).
Chinese Search Report dated Jul. 12, 2022 for Application Serial No. 202110033284 (2 pages).

* cited by examiner

ENTRANCE PERMIT CONTROL

RELATED APPLICATION DATA

This application claims the benefit of Swedish Patent Application No. 2050082-3, filed Jan. 28, 2020, the disclosure of which is incorporated herein by reference in its entirety.

TECHNICAL FIELD

The present disclosure relates generally to entrance permit control, and in particular to validation of codes carried by individuals to pass through an entrance into a restricted area.

BACKGROUND ART

When large numbers of people are about to enter a venue, for example an arena for a sports or concert event, the entrance permit control is a time consuming and labor intensive process. The larger venues are capable of housing many thousands of spectators, and the entrance procedure is often slow. In conventional practice, entrance permits are validated at the entrance by manual inspection of the permit or by manual scanning of a code on the permit by entrance hosts. Alternatively, a mechanical gate such as a turnstile or sliding door at the entrance may be opened by the holder of the permit presenting a valid code on the permit to a scanning station at the entrance. If the entrance control procedure could be done quicker, it would not only improve the comfort and convenience of the individuals that want to pass the entrance but also allow entrance hosts to focus on security issues and other welcoming parts of the entrance procedure.

The same problem occurs in other situations in which entrance permits need to be validated before an individual is allowed to pass an entrance into a restricted area, for example at entrance points to buildings, offices, factories, etc., or when boarding passengers onto a vehicle, such as a train, airplane, ship, etc.

SUMMARY

It is an objective to at least partly overcome one or more limitations of the prior art.

A further objective is to provide a seamless experience for individuals passing through an entrance into a restricted area without compromising the validation of entrance permits.

Another objective is to enable automated validation of entrance permits.

Yet another objective is to enable entrance permit control without mechanical gates at the entrance.

One or more of these objectives, as well as further objectives that may appear from the description below, are at least partly achieved by a system for monitoring an entrance region, a method of monitoring an entrance region, and a computer-readable medium in accordance with the independent claims, embodiments thereof being defined by the dependent claims.

Still other objectives, as well as features, embodiments, aspects and advantages may appear from the following detailed description, from the attached claims as well as from the drawings.

BRIEF DESCRIPTION OF THE DRAWINGS

Embodiments will now be described in more detail with reference to the accompanying drawings.

DETAILED DESCRIPTION OF EXAMPLE EMBODIMENTS

Figure 1A:
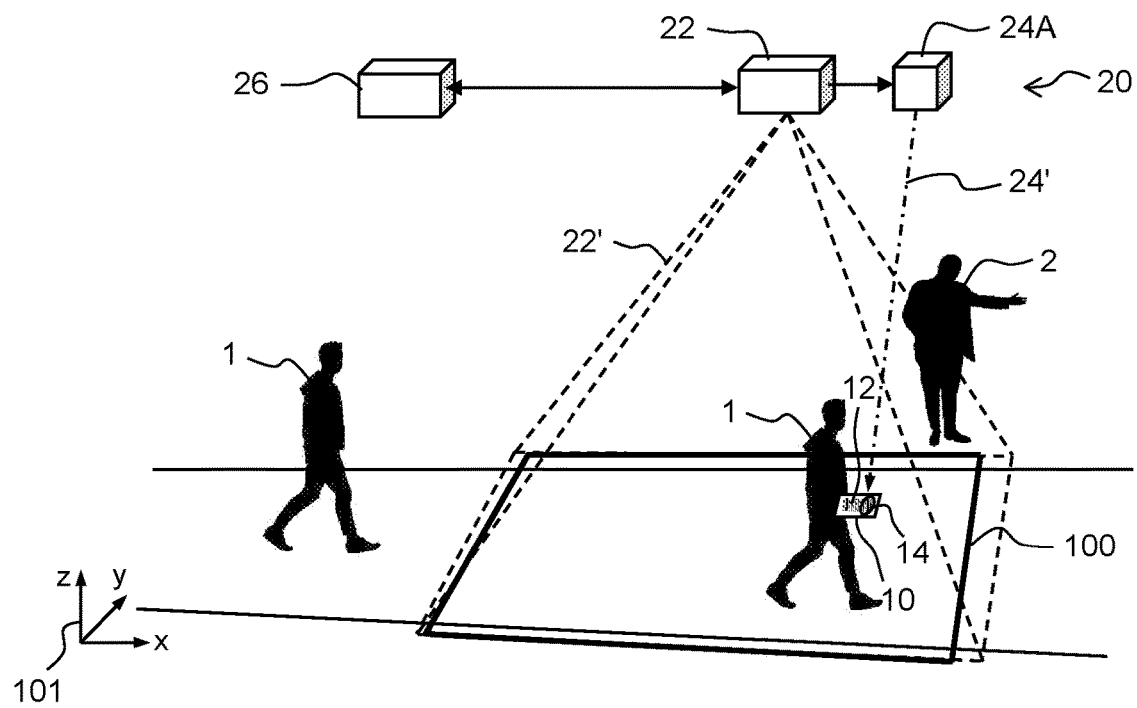
FIG. 1A is a perspective view of a system for entrance permit control in accordance with an embodiment.

Embodiments will now be described more fully hereinafter with reference to the accompanying drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

As used herein, the terms "multiple", "plural" and "plurality" are intended to imply provision of two or more items, whereas the term a "set" of items is intended to imply a provision of one or more items. The term "and/or" includes any and all combinations of one or more of the associated listed items.

As used herein, "entrance" refers to any type of opening that enables individuals to enter a restricted area. The restricted area is an area, region or space that unauthorized individuals are not allowed to enter. The restricted area may be a naturally or intentionally enclosed area, region or space.

As used herein, "entrance permit" refers to any type of physical or electronic document that confers the holder the right to enter a restricted area through an entrance. The entrance permit may be associated with a specific individual or group of individuals, or be a general permit irrespective of the holder. The entrance permit is also denoted "ticket" herein. The entrance permit may, for example, give the holder the right to enter a building, travel by public transport, or participate in an event.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like numerals refer to like elements throughout.

Embodiments relate to a system and a method for entrance permit control and aim at providing a seamless experience for individuals passing through an entrance into a restricted area without compromising the validation of entrance permits presented by the individuals. This is generally achieved by remotely monitoring an entrance region by one or more imaging devices and applying computer vision to both detect and track the entrance permits that are presented by the individuals in the entrance region. The detection allows the entrance permits to be validated while the respective individual traverses the entrance region, thereby obviating the need for the individuals to line up to present the entrance permit at a dedicated scanning station. The tracking of entrance permits makes it possible to objectively determine whether the entrance permits, and thus the holders, have or have not entered the restricted area. The tracking may also be used for timing visual feedback indicative of the outcome of the validation, for example to indicate to an entrance guard whether the validation has failed or succeeded. The tracking may also be used for targeting the visual feedback onto the entrance permit and/or the holder.

FIG. 1A is a schematic perspective view of a monitoring system 20 in accordance with an embodiment. The monitoring system 20 is arranged to monitor an entrance region or entrance way 100, through which individuals ("users") 1 move to enter a restricted area (to the right in FIG. 1A). The entrance region 100 may be marked on the floor, for example by lines, adhesive patches or projected light, and/or be partly delimited by with physical elements such as walls, poles, ropes, etc. to guide the individuals 1 towards the entrance. In the entrance region 100, the respective individual 1 is required to present an entrance permit or ticket to the monitoring system 20, which then performs a validation of the ticket and provides visual feedback onto the ticket and/or the individual 1. In FIG. 1A, the ticket is visualized on a medium or carrier 10 and includes a machine-readable code (MRC) 12. The medium 10 may be a passive or active device. For example, the medium 10 may comprise a passive substrate (paper, plastics, etc.) onto which the MRC has been applied, for example by printing, gluing, engraving, embossing, etc. Alternatively, the medium 10 may be a portable electronic device such as a mobile phone, a personal digital assistant, a tablet computer, a smart watch etc., which is operable to present the MRC 12 on a display. The user may have electronically received the MRC 12 on the portable electronic device as part of a conventional ticket booking procedure. The MRC 12 is optically readable and may have any suitable format and configuration. Non-limiting examples of MRCS include one-dimensional (1D) barcodes, characters in clear text (numbers, letters, etc.), and two-dimensional (2D) codes such as matrix barcodes. In one embodiment, the MRCS 12 on different tickets are at least statistically unique.

In the illustrated example, an entrance guard or host 2 is stationed at the entrance to welcome the individuals and to inspect the visual feedback 14 (below) that is provided by the monitoring system 20 and, based thereon, stop any individual that is not authorized to enter.

In the example of FIG. 1A, the monitoring system 20 comprises a number of sub-systems, each of which may be implemented as a unitary device or an assembly of components. A computer vision sub-system (CVS) 22 is arranged at the entrance region 100 and defines a field of view 22' that includes the entrance region 100, and possibly part of the restricted area. The CVS 22 may comprise or be connected to a set of imaging devices that defines the field of view 22'. In one embodiment, at least one imaging device is located above the individuals 1 in the entrance region 100 to provide a top view of the entrance region 100 or part thereof. It is also conceivable that at least one imaging device is located level with the individuals and/or at the floor to provide further views onto the entrance region and/or the individuals 1 therein. The CVS 22 is configured to process digital images generated by the set of imaging devices to detect and track the MRC 12 on the respective ticket, as will be described in further detail below.

A feedback sub-system 24A is arranged at the entrance region 100 to provide visual feedback onto the medium 10 and/or the individual 1, subject to input data from the CVS 22. In FIG. 1A, the feedback sub-system 24A is operable to generate the visual feedback in the form of a visual indication by projecting a beam of light 24' to illuminate at least part of the medium 10 and/or the individual 1 carrying the medium 10, as schematically indicated by reference numeral 14 in FIG. 1A. If the medium 10 is an electronic device, the visual feedback/indication may be shown on a display of the electronic device, instead of or in addition to the visual feedback/indication provided by the beam of light 24'.

A validation sub-system 26 is arranged in communication with the CVS 22 and is configured to perform a validation of code data that corresponds to a respective MRC 12 detected by the CVS 22 in the entrance region 100, and provide a validation result back to the CVS 22. The validation sub-system 26 may or may not be part of the monitoring system 20 and may be located at the entrance region 100 or at a remote location.

Figure 2:
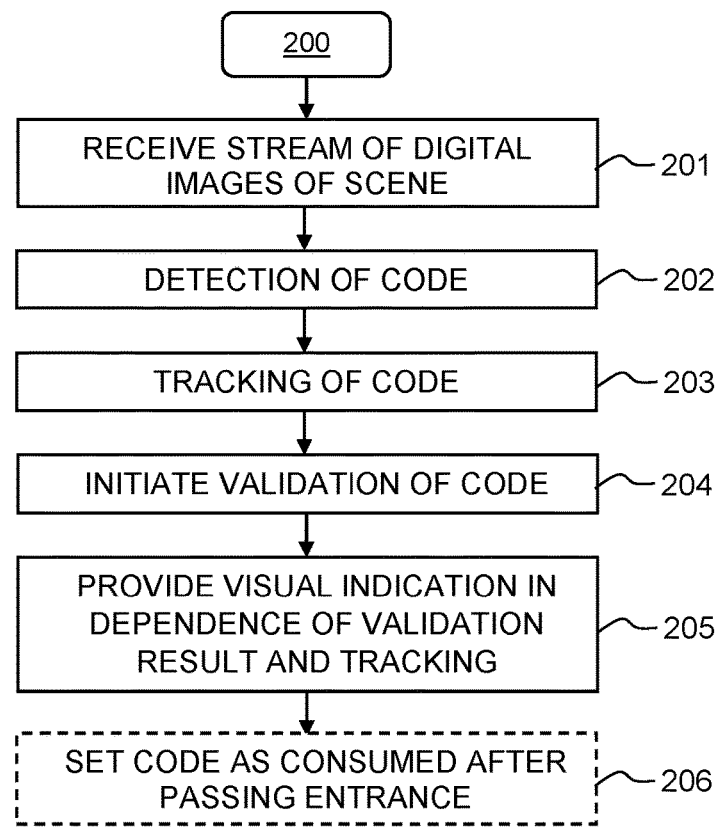
FIG. 2 is a flow chart of a method for entrance permit control in accordance with an embodiment.

FIG. 2 is a flow chart of a monitoring method 200 in accordance with an embodiment. In one example, the method 200 is performed by the CVS 22 in FIG. 1A. Step 201 receives, from the set of imaging devices, a stream of digital images of a scene that includes the entrance region 100, where the stream of images represents at least one view of the entrance region 100. If multiple imaging devices are installed at the entrance region 100, the imaging devices may be arranged to provide different and/or partially overlapping views of the scene. Step 202 processes the received (incoming) stream of images for detection of the MRC 12, which is permanently or temporarily displayed by the medium 10 in the entrance region 100. Step 202 may apply any suitable image processing for detecting the MRC 12. Image processing for real-time MRC detection in images is a well-established technology and numerous algorithms are available to the skilled person. Such algorithms may include one or more of edge detection, thresholding, detection of reference features, correction for image distortion, segmentation, classification, etc. Deep learning object detection algorithms have also been proposed. Examples of detection algorithms are, for example, found in the article "Real-Time Barcode Detection and Classification Using Deep Learning", by Hansen et al, published in Proceedings of the 9th International Joint Conference on Computational Intelligence—Volume 1: IJCCI, pp. 321-327, 2017, and references cited therein.

Step 203 performs a location tracking of the MRC 12 within the entrance region 100 based on the received stream of images. As used herein, "location tracking" refers to determining position data for an object as a function of time. Thus, step 203 generates a time-sequence of position data for a respective MRC 12, for example in a coordinate system 101 associated with the entrance region 100 (FIG. 1A). In one embodiment, step 203 starts the location tracking whenever step 202 detects a new MRC 12 in the entrance region 100. The position data generated by step 203 may comprise two-dimensional (2D) positions within the entrance region 100, for example given by (x,y) coordinates, or three-dimensional (3D) positions, for example given by (x,y,z) coordinates. The location tracking of step 203 may involve a detection process, similar to the detection in step 202, and an association process that associates sequential detections by the detection process into a trajectory for each MRC 12. Each of steps 202 and 203 may be capable of concurrently detecting and tracking, respectively, plural MRCS 12 within the entrance region 100.

In step 204, a validation of the MRC 12 is initiated. Step 204 may initiate the validation whenever step 202 detects a new MRC 12, or when step 203 has tracked the MRC 12 for a predetermined time period. In a further alternative, step 204 may initiate the validation when the MRC 12, according to the position data from step 203, is located within a predefined sub-region of the entrance region 100 (cf. 100A in FIG. 1B). The initiation by step 204 causes the validation to be performed, either locally within the CVS 22 or externally thereof. In the example of FIG. 1A, the validation may be performed by sub-system 26 in response to a query from the CVS 22. In one embodiment, the validation comprises checking if the MRC 12 is valid for entry into the restricted area, for example by evaluating the MRC 12, or code data embedded or encoded in the MRC 12, in relation to valid codes. Such code data may be extracted from the MRC 12 by step 202, or by step 204 before initiating the validation. If a match is found, the validation may designate the MRC 12 as accepted, otherwise as rejected. In one embodiment, the validation comprises comparing the code data to an explicit list of valid codes. In another embodiment, the validation comprises operating a predefined algorithm on the code data to produce a result indicative of its validity. Such a predefined algorithm may be a simple checksum or a more complex algorithm.

Step 205 provides the visual feedback 14 in dependence of the outcome of the validation initiated by step 204 and the position data generated by the location tracking of step 203. The visual feedback 14 may be generated to allow an observer to distinguish between the ticket being rejected by the validation and the ticket being accepted by the validation. For example, different colors and/or patterns may be presented by step 204 depending on the outcome of the validation. Alternatively, only one outcome of the validation is indicated visually, for example rejection or acceptance.

Figure 1B:
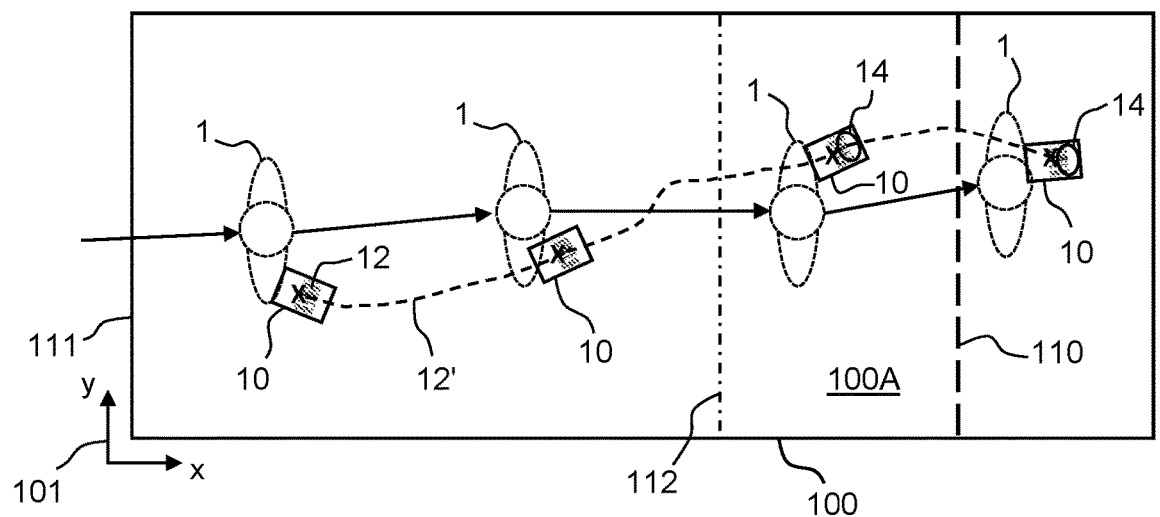
FIG. 1B is a plan view of an individual passing through an entrance region monitored by the arrangement of FIG. 1A.

The method 200 in FIG. 2 provides numerous technical advantages to the monitoring system 20. For better understanding of these advantages refer to FIG. 1B, which is a top plan view of an entrance region 100. In the example of FIG. 1B, the entrance region 100 admits individuals at its left-end side 111 and defines a passageway to an entrance 110 at its right-end side, leading to the restricted area. FIG. 1B illustrates four instances of an individual 1 walking through the entrance region 100 to pass the entrance 110, while holding the medium 10 so that its MRC 12 is visible to the monitoring system. In FIG. 1B, a cross (x) represents the position of the MRC 12 as determined by the monitoring system 20 at each instance, and the dashed curve 12' represents the trajectory or path of positions generated by the location tracking. By tracking MRCs (step 203), the monitoring system 20 is rendered relatively robust and simple. The MRCs have a well-defined appearance in the images which allows for efficient detection and tracking. Tracking of plural MRCs in the stream of images is also facilitated by the fact that the MRCs are carried by a respective individual and therefore are likely to be spatially well-separated and easily distinguishable in the respective image. This should be compared to image-based tracking of individuals, which is commonly hampered by crowding and occlusion, especially in confined spaces. Further, if the MRCs on different tickets are unique, the tracking may be rendered even more robust by including the uniqueness in the tracking. For example, should a particular MRC that is being tracked suddenly disappear in the images, the tracking of this particular MRC may be resumed whenever this MRC is again detected in the images.

If the method 200 is implemented to detect the MRC 12 within the entrance region 100, individuals may be allowed to move freely within the entrance region 100 towards the entrance 110, which inherently will counteract crowding and streamline the entrance procedure.

The method 200 may be implemented with mechanical gates at the entrance 110. However, the method 200 also enables automated entrance permit control without the need for mechanical gates at the entrance 110. Instead, as indicated in FIG. 1A, one or more human gatekeepers 2 may be stationed at the entrance 110 to identify and stop unauthorized individuals based on the visual feedback 14 by step 205.

Further, step 205 enables the visual feedback to be provided in correspondence with the location of the MRC 12. For example, step 205 may provide the visual feedback when the MRC 12 is approaching the entrance 110 according to the position data that is generated by the tracking. In the example of FIG. 1B, the entrance region 100 comprises a feedback sub-region 100A which may have any shape and location within the entrance region 100. In some embodiments, the feedback sub-region 100A is adjacent to or includes the entrance 110. In the example of FIG. 1B, the sub-region 100A extends to the entrance 110 from a virtual or physical separation line 112 which is arranged to be passed by individuals 1 moving towards the entrance 110. In some embodiments, the visual feedback 14 may be provided whenever the ticket is located within the sub-region 100A, thereby ensuring that authorized individuals are visually distinguished from unauthorized individuals in real time and in a well-defined spatial area, for example as the individuals approach the entrance 110. Thus, while the MRC may be detected by step 202 already when it enters the entrance region, the visual feedback may be postponed until the ticket is closer to the entrance. The validation may be initiated by step 203 immediately upon detection of the MRC by step 202, or at a later time.

The method 200 enables the visual feedback 14 to be provided in the form of a projected beam of light 24', as exemplified in FIG. 1A, by step 205 directing the beam of light 24' onto the current position of the MRC 12 as given by the tracking. Thereby, the beam of light 24' may be controlled to follow MRC 12 while it moves towards the entrance 110. It is also conceivable to direct the beam of light 24' onto a position with a given relation to the current position, for example to at least partially illuminate the individual 1 that carries the medium 10 with the MRC 12.

As indicated in FIG. 2, the method 200 may comprise a further step 206 which sets a consumed status of the MRC 12 in a code database when the MRC 12 is deemed to have passed the entrance 110 into the restricted area. Step 206 may operate on the position data generated by the tracking (cf. trajectory 12' in FIG. 1B) to determine if the MRC 12 has passed the entrance 110. In some embodiments, step 203 continues to track the MRC 12 beyond the entrance 110 into the restricted area, as exemplified in FIG. 1B, thereby ensuring that the MRC 12 may be clearly and unambiguously determined to have entered the restricted area. The consumed status may imply that the MRC 12 is no longer valid for entry into the restricted area, at least for a specified time period. Thus, any subsequent validation of the MRC 12 with the specified time period will result in a rejection.

Figure 3:
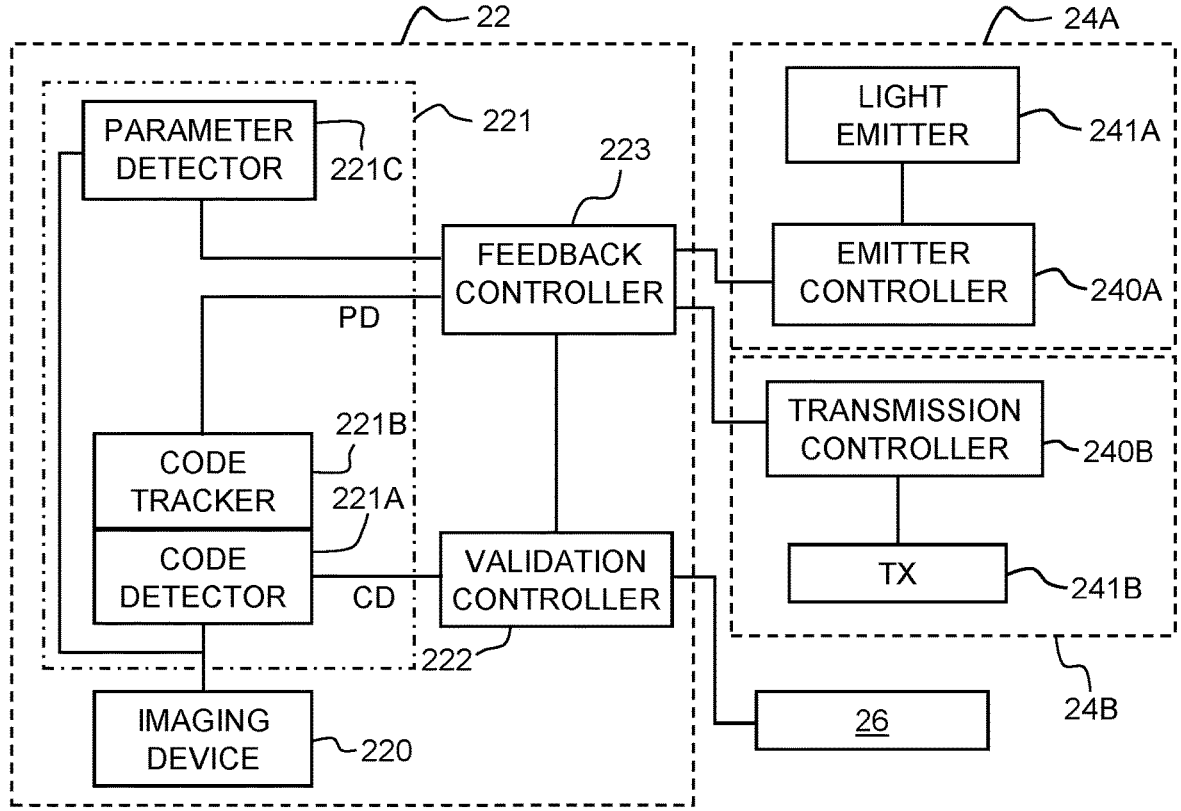
FIG. 3 is a block diagram of an example implementation of the system in FIG. 1A.

FIG. 3 is a block diagram of an example implementation of the monitoring system 20. The computer vision sub-system, CVS, 22 comprises one or more imaging devices 20 (one shown), which provides a stream of digital images. The images are received and processed by an image-processing arrangement 221, which is configured to at least generate code data CD representative of each detected MRC 12 and position data PD representing the movement of each detected MRC 12 in the entrance region 100. The image-processing arrangement 221 comprises a code detector 221A which implements step 202. The code detector 221A is configured to detect MRCS 12 in the stream of images, extract a code from the respective MRC 12, and output corresponding code data CD. The code data CD may include all or part of the code and may be represented as a sequence of characters, symbols or bits. The code detector 221A may also assign a temporary ID ("tag") for the code and output the tag together with the code data CD. The tag may be used internally of the CVS 22 to uniquely identify the respective code/MRC. The code detector 221A may be configured to output the code data CD only once for each MRC 12, at least within a given time period. For example, the code detector 221A may be configured to output the code data CD once for each trajectory. Thus, whenever a trajectory of an MRC 12 is deemed to be terminated, for example by the code tracker 221B (below), the code detector 221A is again operable to detect the same MRC 12 in the digital images and output corresponding code data CD.

The image-processing arrangement 221 further comprises a code tracker 221B which implements step 203. The code tracker 221B is configured to associate MRCS 12 detected by the code detector 221B into one or more trajectories comprising a time-sequence of positions for each detected MRC 12 and output position data PD representative of the one or more trajectories, optionally together with the respective tag. The position data PD is preferably output in real time. The code tracker 221B may be configured to terminate a trajectory when the MRC 12 is deemed to have passed the entrance 110, when the code data CD is rejected by the validation, or when a tracked MRC 12 has not been detected for a predefined time period ("timeout period").

The CVS 22 further comprises a validation controller 222, which implements step 204. The validation controller 222 is configured to receive the code data CD from the code detector 220 and initiate a validation of the code data CD by transmitting a validation query with the code data CD to a validation sub-system 26. The validation controller 22 is further configured to receive a validation response from the validation sub-system 26 indicative of the validation result (accepted/rejected). The validation controller 222 is further configured to output a corresponding validation result, optionally together with the tag.

The CVS 22 further comprises a feedback controller 223, which implements part of step 205. The feedback controller 223 is configured to obtain the validation result from the validation controller 222 and the position data PD from the code tracker 221B and, based thereon, control a feedback sub-system to provide the visual feedback. FIG. 3 depicts a first and a second embodiment of the feedback sub-system, designated by 24A and 24B, respectively. The monitoring system 20 may include at least one of the feedback sub-systems 24A, 24B.

The feedback sub-system 24A is also represented in FIGS. 1A and 1s configured to project the beam of light (24' in FIG. 1A). The sub-system 24A comprises an emitter controller 240A and one or more light emitters 241A. The emitter controller 240A is configured to, upon receiving a control signal from the feedback controller 223, control the light emitter(s) 241A to generate the beam 24' to represent the validation result and to steer the beam 24' to a location given by the position data PD in a coordinate system of the entrance region (cf. 101 in FIGS. 1A-1B). The light emitter(s) 241A may be any conventional light source, such as a lamp, a laser, an LED, etc. In one embodiment, the feedback sub-system 24A is configured as a projector with a directivity control mechanism, for example comprising one or more electrical motors. In some embodiments, the feedback sub-system 24A may be operated to project green light for an accepted (valid) ticket and red light for a rejected (non-valid) ticket. The beam 24' may or may be divergent, collimated or convergent (focused). In one embodiment, the feedback-system 24A may be operable to achieve a pre-defined beam width at a location given by 3D coordinates in the position data PD, for example to ensure clarity and distinctness of the visual feedback.

In one embodiment, the feedback sub-system 24A may be configured to perform a self-calibration process, for example at startup of the monitoring system 20, when a set of MRCS has been placed within the entrance region 100. During the self-calibration process, the monitoring system 20 may operate to detect the respective MRC, generate the position data PD and control the feedback sub-system 24A to generate and steer a respective beam 24' in accordance with the position data PD. A parameter detector 221C in the CVS 22 may be configured to receive and analyze one or more digital images from the imaging device(s) 220 for detection of the visual indication 14 produced by the respective beam 24'. The detector 221C may be configured to determine one or more parameters for the respective visual indication 14, such as one or more of position, shape and width, and provide the parameter(s) to the emitter controller 240A, which may implement a control loop for adjusting the emitted beam 24' based on the parameter(s) until sufficient agreement is achieved with set values for the parameter(s). It is also conceivable that the parameter detector 221C is operable during regular operation of the monitoring system 20 to produce the one or more parameter(s), and that the feedback-system 24A is configured to at least intermittently operate the control loop to perform a real-time adjustment of the emitted beam 24'.

The feedback sub-system 24B may be used when the medium 10 is an electronic device, to cause the electronic device to display the visual feedback 14. The sub-system 24B may or may not be located at the entrance region 100. The sub-system 24B comprises a transmitter controller 240B and a wireless transmitter 241B. The transmitter controller 240B is configured to, upon receiving a control signal from the feedback controller 223, control the transmitter 241B to transmit a wireless signal which indicates the validation result and, when received by the electronic device, causes the electronic device to display the visual indication 14 together with the MRC 12. For example, the electronic device may indicate the validation result by displaying a colored area, picture or the like separate from the MRC and/or apply a coloring or other marking onto the MRC. In one embodiment, the controller 240B may operate the transmitter 241B to broadcast the wireless signal and include, in the wireless signal, an identifier that allows the electronic device to determine that it is the intended recipient of the wireless signal. Such an identifier may be or include at least part of the code data CD. Alternatively, the feedback sub-system 24B may be part of a data distribution system to be exemplified below with reference in FIG. 4.

Figure 4:
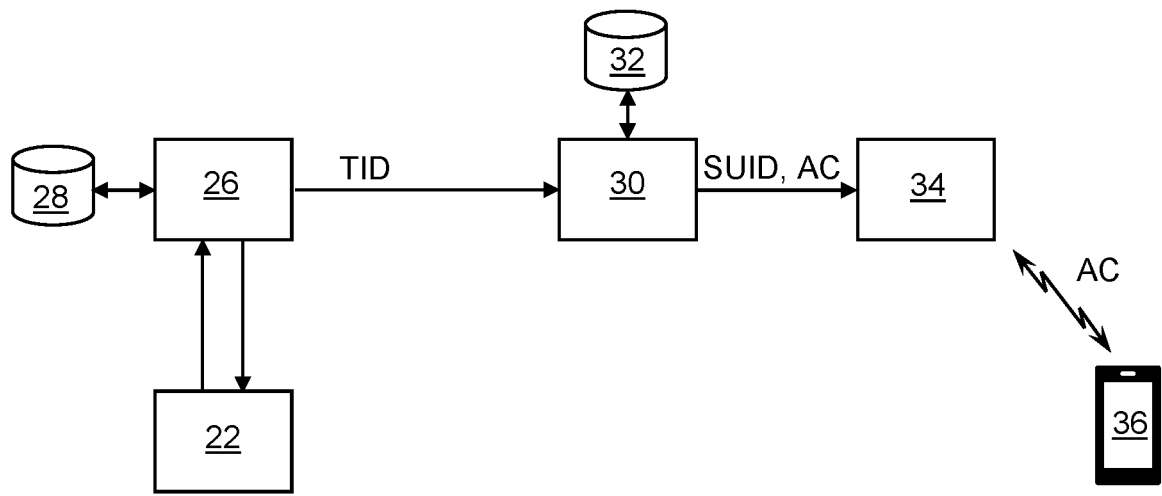
FIG. 4 is a block diagram of a digital rights management system combined with the system in FIG. 1A.

The data distribution system in FIG. 4 is based on the insight that it might be advantageous to couple or integrate the monitoring system 20 with a digital access right management system. For example, the monitoring system 20 may be connected to a cloud-based system for secure and simple remote distribution of access rights ("credentials"). Such a combined monitoring system may provide an encrypted channel between a service provider and connected electronic devices, such as phones and wearables, and enable efficient provisioning management over the air. In the example embodiment of FIG. 4, the validation sub-system 26 is connected for communication with a credentials assignment module 30, which is in turn connected for communication with a distribution module 34, which is configured to distribute data to selected user devices 36 by wireless communication.

Figure 5:
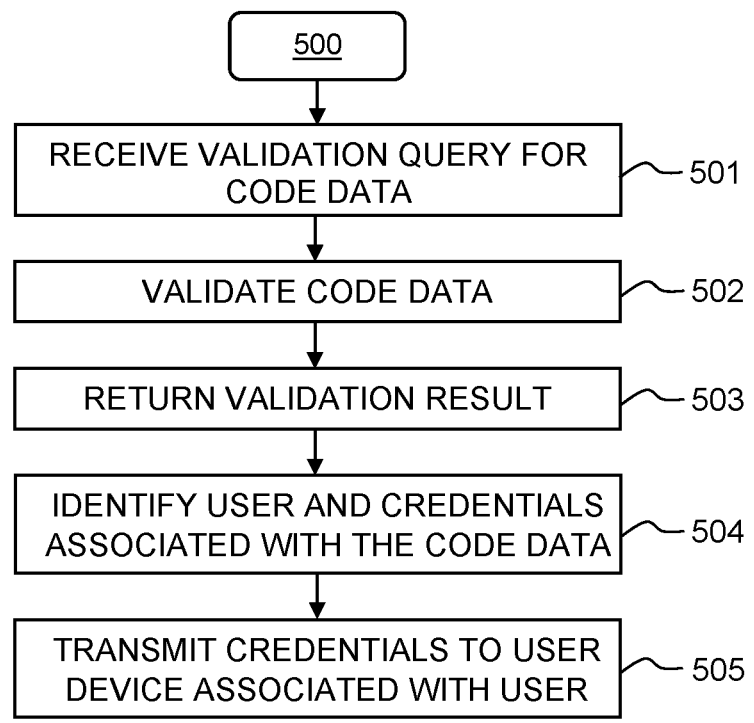
FIG. 5 is a flow chart of a method for validation in accordance with an embodiment.

The combined system in FIG. 4 may be operated in accordance with a credentials distribution method 500 depicted in FIG. 5. In step 501, a validation query is received by the validation sub-system 26 from the CVS 22. The validation query includes code data CD to be validated. In step 502, the code data CD is validated by the validation sub-system 26, for example by comparing the code data CD to a list of valid codes stored in a code database 28. In step 503, a validation response is returned to the CVS 22 by the validation sub-system 26, for example designating the code data CD as accepted or rejected. Steps 501-503 may be performed irrespective of any coupling to a digital access right management system. Step 504 identifies a user identity and a set of digital credentials associated with the code data CD. Step 504 may be performed by the credentials assignment module 30. In one example, indicated in FIG. 4, the validation sub-system 26 determines, after finding code data CD to be valid, a ticket ID (TID) for the code data CD and transmits the TID to the module 30. The TID may comprise at least part of the code data DB or be associated with the code data CD in the code database 28. Upon receipt of the TID, the assignment module 30 may access a credentials database 32 to derive a user identifier and a set of digital credentials associated with the TID. In one embodiment, the user identifier designates a secure user ID (SUID) to which the set of digital credentials is to be distributed. In step 505, the set of digital credentials are transmitted for secure storage in a user device 35 associated with the user identifier. In the example of FIG. 4, the assignment module 30 transmits the SUID and the set of digital credentials (AC) to the distribution module 34, which wirelessly transmits AC to the user device 36. The user device 36 may be any portable electronic device capable of wireless communication. In some embodiments, the user device 36 is identical to, or connected to, the medium 10 that has displayed the MRC 12 to the monitoring system 20. For example, the medium 10 may be a phone and the user device 36 may be a wearable.

The set of digital credentials may grant an individual carrying the user device 36 access to one or more of the restricted area, a sub-area of the restricted area, a piece of merchandise, an experience or a service. The set of digital credentials may thus be provided as a result from the individual entering the restricted area, while the use of the credentials may be coupled to such mentioned grant within or outside of the restricted area. Such access may be granted upon validation of the set of digital credentials, for example by wireless short-range transfer from the user device 36 to a dedicated reader device, for example by Bluetooth, RFID, NFC, or any other commercially available technique. For example, the set of digital credentials may grant access to specific entrance gates, access to stores for shopping, vending machines, photo booths or anything that a user having a valid entrance permit would receive additional value by being offered a digital additional access grant.

In one embodiment the set of credentials are time limited, with a valid time window related to the time of the individual entering the restricted area.

In one embodiment, the set of credentials may be presented to a reader device to open a mechanical gate at the entrance to the restricted area. In such an embodiment, the monitoring system 20 may provide the visual feedback for the purpose of informing the user about the validation result, and the user may be then be granted access upon transfer of the set of credentials to the reader device.

One general benefit of the ticket-based distribution of credentials as exemplified in the foregoing is that a stolen or copied ticket will be less valuable since the ticket cannot be used in combination with the user device 36 to with the set of credentials is provided.

To enable the ticket-based distribution of credentials, the following actions may be taken. Upon issuing a ticket, the credentials database 32 may be updated with the ticket ID (TID) and coupled with: the set of credentials (AC), and the secure user ID (SUID) to which the set of credentials (AC) is to be provided. The TID may also be associated with one or more constraints in the database 32, for example a time limit for the respective credential. Upon receipt of the TID from the validation sub-system 26, the assignment module 30 may activate the set of credentials based on the associated data stored in the database 32.

As noted above, the data distribution system in FIG. 4 may alternatively or additionally be operable to cause to the medium 10 to display the visual feedback together with the MRC. In such an embodiment, the feedback controller 223 in FIG. 3 may instead be part of the validation sub-system 26 and configured to provide the validation result and the TID to the module 30, which in turn causes the distribution module 34 to wirelessly transmit a control signal that causes the user device 36 (medium 10) to display the visual feedback.

FIG. 6 is a flow chart of a monitoring method 600 in accordance with a detailed example. The method 600 may be performed by the monitoring system 20. In step 601, a stream of digital images ("image stream") is input from at least one imaging device which is arranged to observe the entrance region, or part thereof. In step 602, the incoming image stream is searched or analyzed for presence of a machine-readable code (MRC) of one or more predefined formats. When an MRC is detected, step 603 activates step 604 which may determine a current 2D or 3D position of the MRC in a predefined coordinate system (cf. 101 in FIGS. 1A-1B). The method 600 also executes step 605, which initiates a location tracking of the MRC in subsequent images in the image stream. Any known location tracking algorithm may be implemented by step 605. In a non-limiting example, step 605 may analyze the position(s) generated by step 604 at each time point and analyze the respective position to determine if a new trajectory should be instantiated for the position, if the position should be added to an existing trajectory, or if an existing trajectory should be terminated to end the tracking of the MRC. If the MRCS on different tickets are unique, and thus encode unique codes, the location tracking by step 605 may also account for the code encoded by the respective MRC when allocating positions to trajectories. For example, step 604 may not only determine a position of the respective MRC but also decode the MRC into a unique code. The combination of positions and unique codes makes it possible for step 605 to connect positions to an existing trajectory, even if the positions are well-separated from the existing trajectory in time and/or space. Thus, should a particular MRC disappear in the image stream, the tracking of this particular MRC may be resumed whenever this MRC is again detected in the image stream. The method 600 also comprises a step 606 that performs a validation of the respective MRC that is detected, for example as described hereinabove. If the code data for the MRC is deemed valid (accepted), step 607 proceeds to step 608, which may generate visual feedback indicating that the MRC on the ticket has been accepted, for example in accordance with any of the embodiments or examples described herein. If the code data for the MRC is deemed invalid (rejected), step 607 proceeds to step 609, which may generate visual feedback indicating that the MRC on the ticket has been rejected, for example in accordance with any of the embodiments or examples described herein. If the code data for the MRC is deemed valid, the method 600 may also perform step 610, which evaluates the trajectory for the valid MRC to determine if the MRC passes the entrance into the restricted area. If step 610 determines that the MRC has entered the restricted area, the method 600 may proceed to step 611, which sets the status of the MRC as consumed, for example in the code database 28 (FIG. 4). Step 611 then proceeds to step 612, which terminates the trajectory, and step 608 terminates the visual feedback. If the MRC does not pass into the restricted area via the entrance within a predefined timeout period, or if the MRC is found to leave the entrance region 100 or the feedback sub-region 100A (FIG. 1B), step 610 may proceed to step 612 and step 608 may terminate the visual feedback. Likewise, step 609 may proceed to step 612 and, optionally after a delay period, terminate the visual feedback.

Figure 6A:
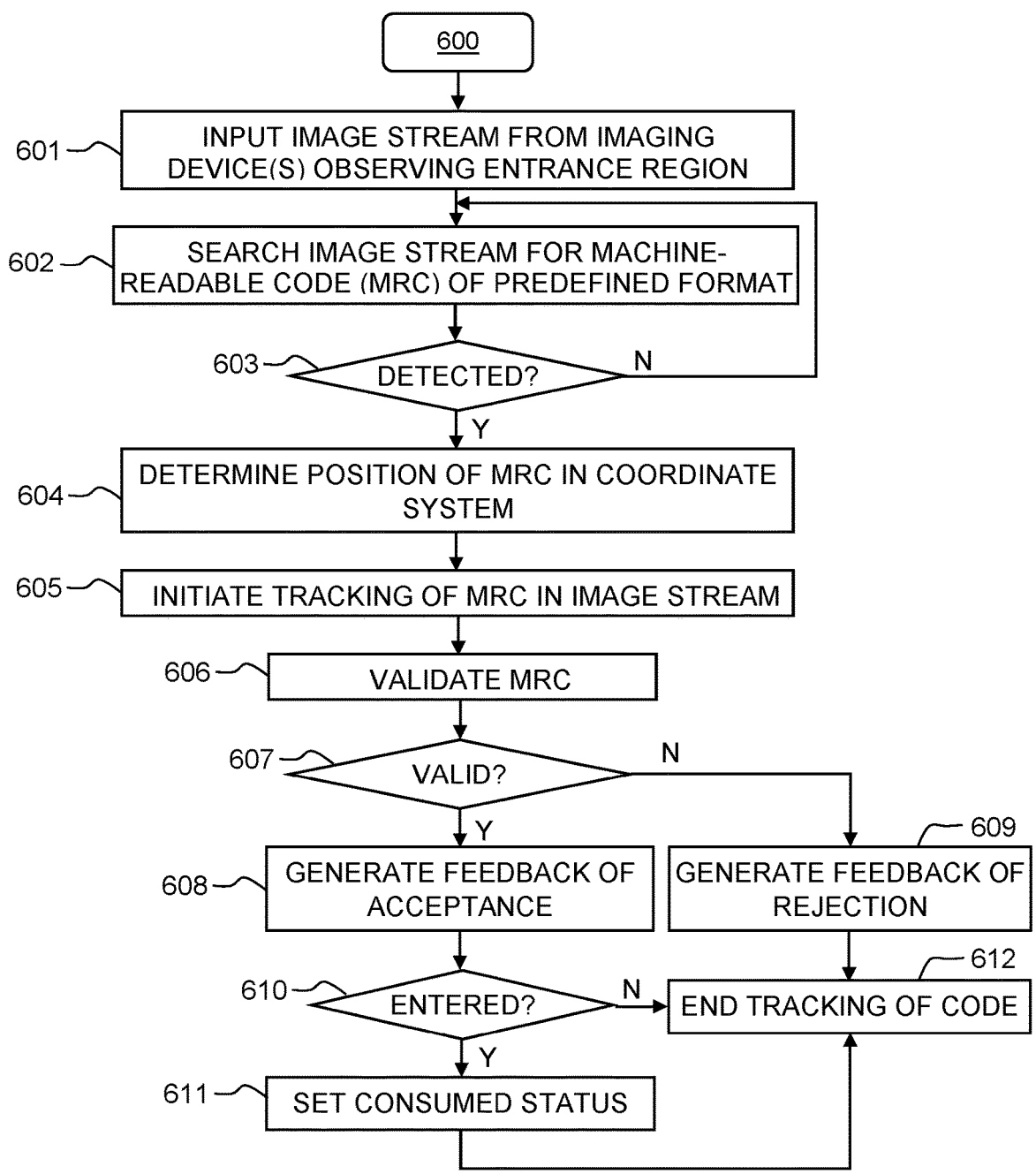
FIG. 6A is a flow chart of a method for entrance permit control in accordance with an embodiment.
Figure 6B:
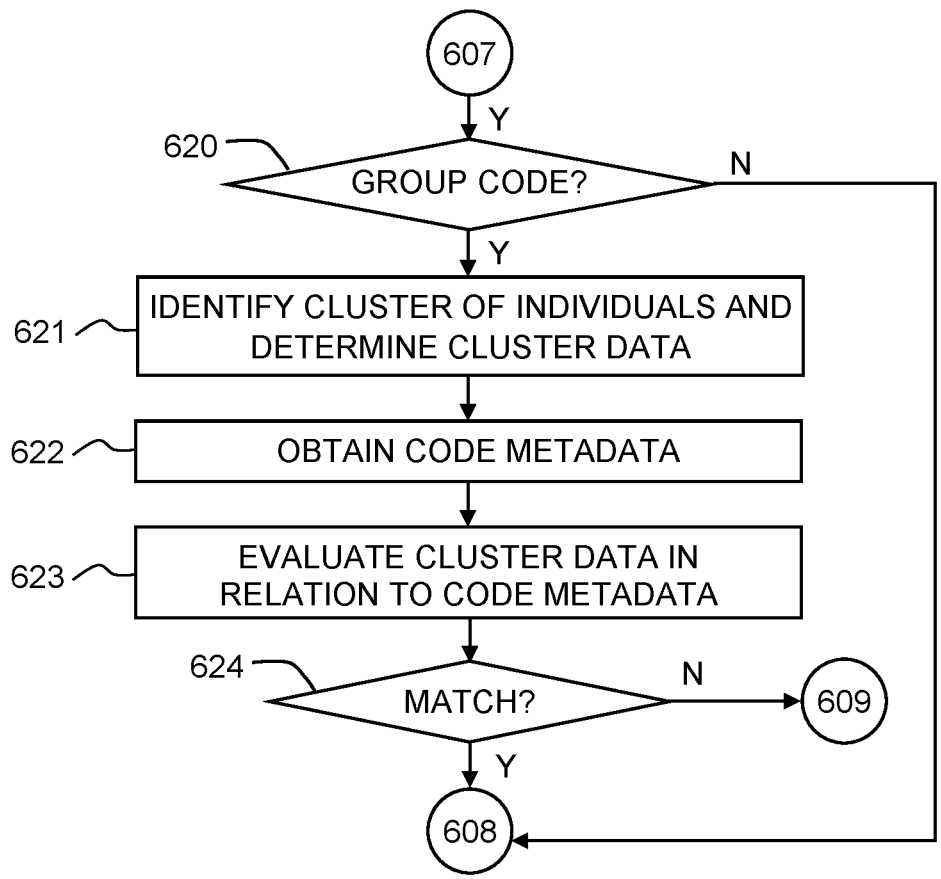
FIG. 6B is a flow chart of a method for handling group entrance permits.

FIG. 6B is a flow chart of additional steps that may be included in the method 600 of FIG. 6A to handle tickets that are issued for a group of individuals, denoted "group tickets" in the following. The group ticket may include one MRC for each individual in the group or one MRC for the entire group. As indicated, the additional steps 620-624 may be included in the method 600 between steps 607 and 608. Step 620 evaluates the MRC that has been deemed valid by step 607 to determine if the MRC belongs to a group ticket or not. For example, step 620 may identify that an MRC belongs to a group ticket based on the format of the MRC and/or the code encoded by the MRC. If no group ticket is detected in step 620, the method proceeds to step 608. If a group ticket is detected, step 620 proceeds to step 621, which processes one or more images in the image stream for identification of one or more clusters of individuals in relation to the position of the MRC. Step 621 may, for example, first identify the individual that carries the MRC and then identify one or more clusters including this individual. Since individuals of a group are likely to be close to each other, step 621 may identify one or more clusters as a function of the relative locations of the individuals in the image(s) or in the coordinate system of the entrance region. Alternatively or additionally, since individuals of a group are likely to move in unison through the entrance region, step 621 may identify clusters as a function of the movement patterns of the individuals between images or in the coordinate system of the entrance region. Alternatively or additionally, if the individuals in groups have been instructed to hold hands or otherwise connect to each other, step 621 may identify a cluster by detecting visible connections between individuals. Step 621 also determines cluster data that is characteristic to the respective cluster. For example the cluster data may include one or more of the number of individuals in the cluster, an age of one or more individuals in the cluster, a gender of one or more individuals in the cluster, one or more gait parameters of one or more individuals in the cluster, or one or more appearance parameters of one or more individuals in the cluster. Examples of appearance parameters include facial recognition parameters, hair color, hair property (for example, straight or curly), skin color, eye color, body shape, weight, etc. Step 622 obtains metadata for the MRC ("code metadata", CMD), for example from the code database 28 (FIG. 4). The CMD thus comprises reference data that corresponds to the cluster data and may be entered by the individuals, for example in the form of profile data, or be generated during a separate registration stage, which may involve determining gait parameters, facial recognition parameters, etc. It is also conceivable that step 622 precedes step 621 and that the clustering in step 622 is at least partly based on the CMD. For example, the number and/or gender and/or age of the individuals according to the CMD may improve the clustering. Step 623 evaluates the cluster data of one or more clusters in relation to the CMD, for example by comparing corresponding parameters, and determines if there is a (sufficient) match between the cluster data of an identified cluster and the CMD. If a match is found, step 624 proceeds to step 608 (feedback of acceptance), otherwise step 624 proceeds to step 609 (feedback of rejection).

Figure 7:
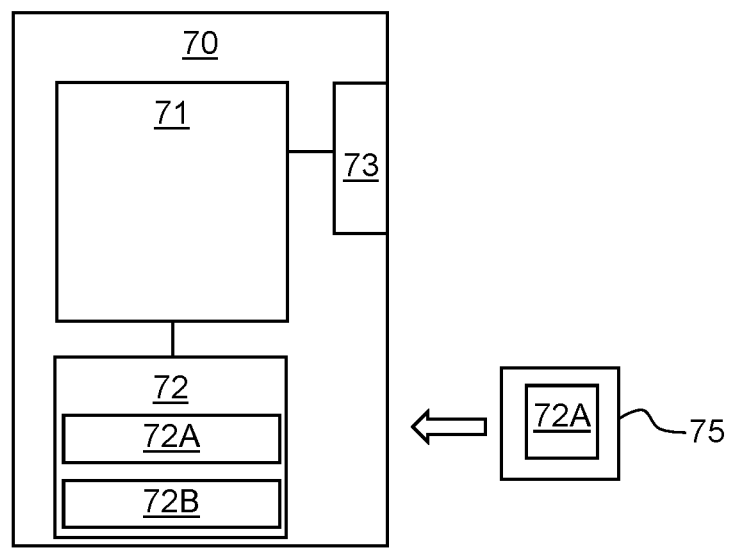
FIG. 7 is a block diagram of a machine that may implement any one of the methods in FIGS. 2, 5, 6A and 6B.

The structures and methods disclosed herein may be implemented by hardware or a combination of software and hardware. In some embodiments, such hardware comprises one or more software-controlled computer resources. FIG. 7 schematically depicts such a computer resource 70, which comprises a processing system 71, computer memory 72, and a communication interface 73 for input and/or output of data. The communication interface 73 may be configured for wired and/or wireless communication. The processing system 71 may e.g. include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 71A comprising computer instructions is stored in the memory 72 and executed by the processing system 71 to perform any of the methods, operations, functions or steps exemplified in the foregoing. As indicated in FIG. 7, the memory 72 may also store control data 72B for use by the processing system 71. The control program 72A may be supplied to the computer resource 70 on a computer-readable medium 75A, which may be a tangible (non-transitory) product (e.g. magnetic medium, optical disk, read-only memory, flash memory, etc.) or a propagating signal.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results. In certain circumstances, parallel processing may be advantageous.

In the following, items are recited to summarize some aspects and embodiments as disclosed in the foregoing.

Item 1: A system for monitoring an entrance region (100) including an entrance (110) to a restricted area, said system comprising:

a computer vision sub-system (221) configured to receive a stream of digital images representing at least one view of the entrance region (100), the computer vision sub-system (221) being configured to process the received stream of digital images for detection of a machine-readable code (12) displayable on a medium (10) carried by an individual in the entrance region (100) and perform, based on the received stream of digital images, a location tracking of the machine-readable code (12) within the entrance region (100), a validation sub-system (222, 26) configured to initiate a validation of the machine-readable code (12) detected by the computer vision sub-system (221), and a feedback sub-system (223) configured to, in dependence of the validation and position data generated by the location tracking, provide a visual indication (14) of a result of the validation on at least one of the medium (10) and the individual carrying the medium (10).

Item 2: The system of item 1, wherein the entrance region (100) comprises a sub-region (100A) adjacent to or including the entrance (110), and wherein the feedback sub-system (223) is configured to provide the visual indication when the machine-readable code (12), according to the position data, is located within the sub-region (100A).

Item 3: The system of item 1 or 2, wherein the validation sub-system (222, 26) is configured to set a consumed status of the machine-readable code (12) in a code database (28) when the machine-readable code (12), based on the position data, is deemed to have passed the entrance (110).

Item 4: The system of any preceding item, wherein the medium (10) is an electronic device, and wherein the feedback sub-system (223) is configured to cause the electronic device to display at least part of the visual indication (14).

Item 5: The system of any preceding item, wherein the feedback sub-system (223) is configured to cause a light projection device (24) to project a beam of light onto at least one of the medium (10) or the individual carrying the medium (10), to present at least part of the visual indication (14).

Item 6: The system of item 5, wherein the feedback sub-system (223) is configured to cause the light projection device (24) to project the visual indication onto a location given by the position data.

Item 7: The system of any preceding item, wherein the validation sub-system (222, 26) is configured to, based on the machine-readable code (12), identify a set of digital credentials and a user device (36), and cause the set of digital credentials to be wirelessly transmitted to the user device (36) for secure storage in the user device (36).

Item 8: The system of item 7, wherein the set of digital credentials grant an individual carrying the user device (36) access to one or more of the restricted area, a sub-area of the restricted area, a piece of merchandise, an experience or a service within the restricted area.

Item 9: The system of any preceding item, wherein the validation comprises evaluating the machine-readable code (12) in relation to valid codes, and designating the machine-readable code (12) as accepted if the machine-readable code (12), or code data derived therefrom, matches one of the valid codes.

Item 10: The system of any preceding item, wherein the computer vision sub-system (221) is operable to process the received stream of digital images to identify a cluster of individuals in association with the machine-readable code (12) and generate cluster data representing the cluster of individuals, and wherein the system is further configured to obtain metadata associated with the machine-readable code (12), and evaluate the cluster data in relation to the metadata.

Item 11: The system of item 10, wherein the computer vision sub-system (221) is configured to identify the cluster of individuals as a function of one or more of: a visible connection between the individuals, relative locations of the individuals, or movement patterns of the individuals.

Item 12: The system of item 10 or 11, wherein the cluster data comprises one or more of: a number of individuals in the cluster, an age of one or more individuals in the cluster, a gender of one or more individuals in the cluster, one or more gait parameters of one or more individuals in the cluster, or one or more appearance parameters of one or more individuals in the cluster.

Item 13: A method of monitoring individuals in an entrance region including an entrance to a restricted area, said method comprising:

receiving (201) a stream of digital images representing at least one view of the entrance region;

processing (202) the received stream of digital images for detection of a machine-readable code displayable on a medium carried by an individual in the entrance region;

tracking (203), based on the received stream of digital images, a location of the machine-readable code within the entrance region;

initiating (204) a validation of the machine-readable code; and providing (205), in dependence of the validation and position data generated by the tracking (203), a visual indication of a result of the validation on at least one of the medium and the individual carrying the medium.

Item 14: The method of item 13, wherein said providing (205) comprises: providing the visual indication when the machine-readable code (12), according to the position data, is located within a sub-region (100A) of the entrance region (100), the sub-region (100A) being adjacent to or including the entrance (110).

Item 15: The method of item 13 or 14, further comprising assigning a consumed status to the machine-readable code (12) when the machine-readable code (12), based on the position data, is deemed to have passed the entrance (110).

Item 16: The method of any one of items 13-15, wherein the medium (10) is an electronic device, and wherein said providing (205) comprises causing the electronic device to display at least part of the visual indication (14).

Item 17: The method of any one of items 13-16, wherein said providing (205) comprises projecting a beam of light onto at least one of the medium (10) and the individual carrying the medium (10), to present at least part of the visual indication (14).

Item 18: The method of item 17, wherein said providing (205) comprises projecting the visual indication onto a location given by the position data.

Item 19: The method of any one of items 13-18, further comprising identifying, based on the machine-readable code (12), a set of digital credentials and a user device (36), and causing the set of digital credentials to be wirelessly transmitted to the user device (36) for secure storage in the user device (36).

Item 20: The method of item 19, wherein the set of digital credentials grant an individual carrying the user device (36) access to one or more of the restricted area, a sub-area of the restricted area, a piece of merchandise, an experience or a service.

Item 21: The method of any one of items 13-20, wherein the validation comprises evaluating the machine-readable code (12) in relation to valid codes, and designating the machine-readable code (12) as accepted if the machine-readable code (12), or code data derived therefrom, matches one of the valid codes.

Item 22: The method of any one of items 13-21, wherein said processing (202) comprises: processing the received stream of digital images to identify a cluster of individuals in association with the machine-readable code (12) and generating cluster data representing the cluster of individuals, and the method further comprising: obtaining metadata associated with the machine-readable code (12), and evaluating the cluster data in relation to the metadata.

Item 23: The method of item 22, wherein said processing (202) comprises: identifying the cluster of individuals as a function of one or more of: a visible connection between the individuals, relative locations of the individuals, or movement patterns of the individuals.

Item 24: The method of item 22 or 23, wherein the cluster data comprises one or more of: a number of individuals in the cluster, an age of one or more individuals in the cluster, a gender of one or more individuals in the cluster, one or more gait parameters of one or more individuals in the cluster, or one or more appearance parameters of one or more individuals in the cluster.

Item 25: A computer-readable medium comprising computer instructions (72A) which, when executed by a processing system (71), cause the processing system (71) to perform the method of any one of items 13-24.

The invention claimed is:

1. A system for monitoring an entrance region including an entrance to a restricted area, the system comprising:
 a computer vision sub-system configured to receive a stream of digital images representing at least one view of the entrance region, the computer vision sub-system being configured to process the received stream of digital images for detection at multiple instances of a machine-readable code displayed on a medium carried by an individual moving within the entrance region and perform, based on the received stream of digital images, a location tracking of the machine-readable code displayed on the medium as it is moved carried by the individual moving within the entrance region;
 a validation sub-system configured to initiate a validation of the machine-readable code detected by the computer vision sub-system; and
 a feedback sub-system configured to, based on the validation and position data generated by the location tracking, provide a visual indication of a result of the validation by causing a light projection device to project a beam of light onto at least one of the medium carried by the individual and/or the individual carrying the medium and to control the beam of light to follow the at least one of the medium and/or the individual carrying the medium as the at least one of the medium and/or the individual carrying the medium moves towards the entrance to the restricted area.

2. The system of claim 1, wherein the feedback sub-system is configured to provide the visual indication when the machine-readable code, according to the position data, is located within a sub-region of the entrance region that is adjacent to or that includes the entrance to the restricted area.

3. The system of claim 1, wherein the validation sub-system is configured to set a consumed status of the machine-readable code in a code database when the machine-readable code, based on the position data, is deemed to have passed the entrance.

4. The system of claim 1, wherein the medium comprises an electronic device, and wherein the feedback sub-system is configured to cause the electronic device to display at least part of the visual indication.

5. The system of claim 1, wherein the feedback sub-system is configured to cause the light projection device to project the visual indication onto a location given by the position data.

6. The system of claim 1, wherein the validation sub-system is configured to, based on the machine-readable code, identify a set of digital credentials and a user device, and cause the set of digital credentials to be wirelessly transmitted to the user device for secure storage in the user device.

7. The system of claim 6, wherein the set of digital credentials grant an individual carrying the user device access to one or more of the restricted area, a sub-area of the restricted area, a piece of merchandise, an experience or a service within the restricted area.

8. The system of claim 1, wherein the validation subsystem is configured to evaluate the machine-readable code in relation to valid codes, and designate the machine-readable code as accepted if the machine-readable code, or code data derived therefrom, matches at least one of the valid codes.

9. The system of claim 1, wherein the computer vision sub-system is operable to process the received stream of digital images to identify a cluster of individuals in association with the machine-readable code and generate cluster data representing the cluster of individuals, and wherein the system is further configured to obtain metadata associated with the machine-readable code, and evaluate the cluster data in relation to the metadata.

10. The system of claim 9, wherein the computer vision sub-system is configured to identify the cluster of individuals as a function of one or more of: a visible connection between the individuals, relative locations of the individuals, and/or movement patterns of the individuals.

11. The system of claim 9, wherein the computer vision sub-system is operable to generate the cluster data comprising one or more of: a number of individuals in the cluster, an age of one or more individuals in the cluster, a gender of one or more individuals in the cluster, one or more gait parameters of one or more individuals in the cluster, and/or one or more appearance parameters of one or more individuals in the cluster.

12. A method of monitoring individuals in an entrance region including an entrance to a restricted area, the method comprising:
receiving a stream of digital images representing at least one view of the entrance region;
processing the received stream of digital images for detection at multiple instances of a machine-readable code displayed on a medium carried by an individual moving within the entrance region;
tracking, based on the received stream of digital images, a location of the machine-readable code displayed on the medium as it is moved carried by the individual moving within the entrance region;
initiating a validation of the machine-readable code; and
providing, based on the validation and position data generated by the tracking, a visual indication of a result of the validation by causing a light projection device to project a beam of light onto at least one of the medium carried by the individual and/or the individual carrying the medium and to control the beam of light to follow the at least one of the medium and/or the individual carrying the medium as the at least one of the medium and/or the individual carrying the medium moves towards the entrance to the restricted area.

13. The method of claim 12, wherein the providing the visual indication comprises:
providing the visual indication when the machine-readable code, according to the position data, is located within a sub-region of the entrance region that is adjacent to or that includes the entrance to the restricted area.

14. The method of claim 12, further comprising assigning a consumed status to the machine-readable code when the machine-readable code, based on the position data, is deemed to have passed the entrance.

15. The method of claim 12, wherein the medium comprises an electronic device, and wherein said providing comprises causing the electronic device to display at least part of the visual indication.

16. The method of claim 12, wherein said providing comprises projecting the beam of light onto a location given by the position data, to present at least part of the visual indication.

17. The method of claim 12, further comprising identifying, based on the machine-readable code, a set of digital credentials and a user device, and causing the set of digital credentials to be wirelessly transmitted to the user device for secure storage in the user device.

18. The method of claim 12, wherein said processing comprises: processing the received stream of digital images to identify a cluster of individuals in association with the machine-readable code and generating cluster data representing the cluster of individuals, and the method further comprising: obtaining metadata associated with the machine-readable code, and evaluating the cluster data in relation to the metadata.

19. A non-transitory computer-readable medium comprising computer instructions that, when executed by a processing system, cause the processing system to perform a method of monitoring individuals in an entrance region including an entrance to a restricted area comprising:
receiving a stream of digital images representing at least one view of the entrance region;
processing the received stream of digital images for detection at multiple instance of a machine-readable code displayed on a medium carried by an individual moving within the entrance region;
tracking, based on the received stream of digital images, a location of the machine-readable code displayed on the medium as it is moved carried by the individual moving within the entrance region;
initiating a validation of the machine-readable code; and
providing, based on the validation and position data generated by the tracking, a visual indication of a result of the validation by causing a light projection device to project a beam of light onto at least one of the medium carried by the individual and/or the individual carrying the medium and to control the beam of light to follow the at least one of the medium and/or the individual carrying the medium as the at least one of the medium and/or the individual carrying the medium moves towards the entrance to the restricted area.

\* \* \* \* \*